United States Patent Office 3,418,391
Patented Dec. 24, 1968

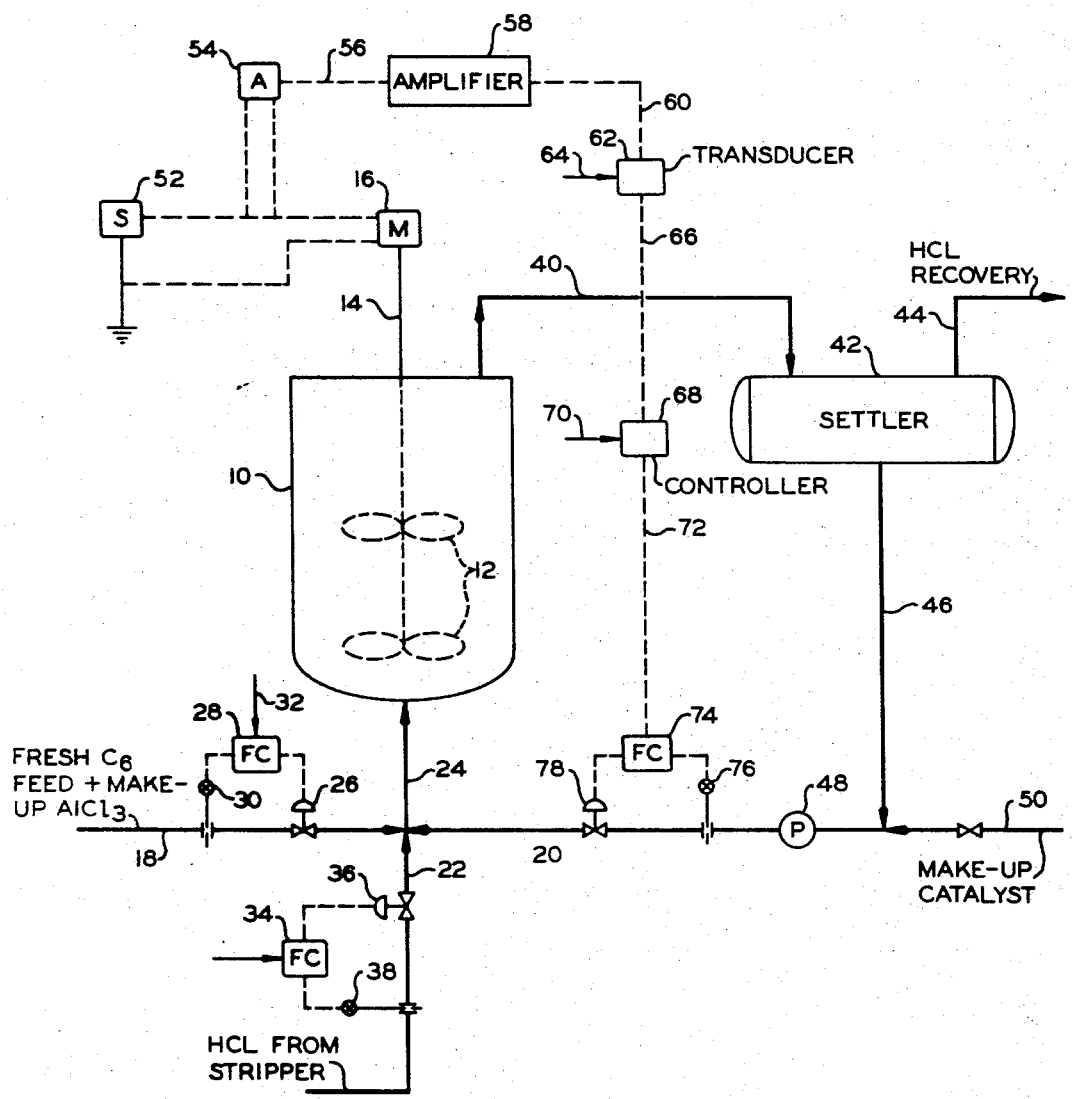

3,418,391
CONTROLLING AN ISOMERIZATION OR
ALKYLATION REACTION
John T. Cabbage, Bartlesville, Okla., assignor to Phillips
Petroleum Company, a corporation of Delaware
Filed June 9, 1965, Ser. No. 462,630
7 Claims. (Cl. 260—683.57)

ABSTRACT OF THE DISCLOSURE

A catalytic reaction in liquid phase in a reactor using a liquid catalyst of substantially different viscosity than the reactant and reaction mixture is controlled by stirring the reaction mixture with a stirrer operated by an electric motor, sensing the power required by said motor to effect the stirring, and regulating the rate of feeding said catalyst to the reactor in response to the sensed power while maintaining feeding rates of other feeds to the reactor substantially constant, thus maintaining a substantially constant ratio of catalyst to reactant.

This invention relates to a process and apparatus for controlling a liquid phase catalytic conversion process in a stirred reactor utilizing a liquid catalyst.

In catalytic reactions or conversions utilizing a liquid catalyst and reactant in liquid phase wherein the viscosity and specific gravity of the catalyst are materially different from those of the reactant, the concentration of catalyst in the reaction mixture can be controlled at a selected level by measuring the viscosity of the reaction mixture and adding liquid catalyst to the reaction mixture at a rate which maintains the desired viscosity. Ogle, U.S. 2,850,552 discloses a commercially successful process for controlling reactions involving liquids of different densities or viscosities utilizing the technique of passing a portion of the effluent from the reactor to a gravitometer to sense the gravity of the effluent and utilizing the sensed gravity to operate a controller on a motor valve in the liquid catalyst feed line to the reactor. In this type of operation, even though good control is provided, there is some lag between the reaction mixture in the reactor and the gravitometer so that there may be differences between the gravity sensed by the gravitometer and the true gravity in the reaction mixture. Another cause in minor variation in the gravity of the stream in gravitometer 18 and in the reaction mixture in the reactor lies in the fact that the effluent stream from the reactor is an emulsion and the settling out of the heavier catalyst phase from the emulsion commences immediately as the stream flows from the reaction mixture within the reactor. Hence, there is a small difference in composition of the stream in line 15 of Ogle's FIGURE 1 and the stream entering line 9 because of minor settling in line 9.

This invention relates to a process and method which more accurately controls the concentration of liquid catalyst in the reaction mixture than the control provided by the aforesaid patent.

Accordingly, it is an object of the invention to provide a simple and effective process and apparatus for accurately controlling the concentration of liquid catalyst in a liquid phase conversion process in a stirred reactor. Another object is to provide a method and apparatus for controlling the concentration of an aluminum halide-hydrocarbon complex liquid catalyst in admixture with a liquid hydrocarbon feed and liquid conversion product in a stirred reactor. A further object is to provide an improved method and arrangement of apparatus for controlling the concentration of an aluminum halide-hydrocarbon complex catalyst, particularly containing aluminum chloride as the aluminum halide of the complex, in the isomerization of a liquid hydrocarbon in a stirred reaction zone. Other objects of the invention will become apparent to one skilled in the art upn consideration of the accompanying disclosure.

In accordance with a broad aspect of the invention the power or torque required to stir the reaction mixture is sensed and the sensed value is utilized to control the flow rate of liquid catalyst to the reactor so as to maintain the power or torque at a preselected level which is a function of the viscosity of the reaction mixture and of the concentration of the liquid catalyst in the reaction mixture. Usually, the stirrer is operated by an electric motor so that the current flow thru the motor, as measured in amperes, is a measure of the torque or power consumption and has a definite relation to the concentration of liquid catalyst in the reaction mixture.

The control is effected by amplifying the ammeter signal and feeding the amplified signal to a transducer which converts the electric signal to a pneumatic signal and this pneumatic signal is fed to a recorder-controller having a set point. The recorder-controller compares the received signal with the set point of the instrument and emits a demand signal required to vary the pneumatic signal in accordance with the set point to re-establish the preselected concentration of liquid catalyst in the reactor. The demand signal is transmitted to a flow controller on the catalyst feed line, receiving a transmitted signal from the line of the existing flow rate and changing the flow rate thru the motor valve in the catalyst feed line in response to the demand signal to provide the required flow rate to re-establish the preselected viscosity in the reaction mixture and concentration of liquid catalyst therein.

A more complete understanding of the invention may be had by reference to the accompanying schematic drawing which illustrates an arrangements of apparatus in accordance with the invention.

Referring to the drawing a reactor 10 is provided with one or more stirrers 12 on an axial shaft 14 which is rotated at preselected speed by motor 16. Hydrocarbon feed from line 18 and liquid catalyst from line 20, together with HCl from line 22 in very minor amount, are introduced to the bottom of reactor 10 thru line 24. The flow rate of liquid feed in line 18 is maintained relatively constant by motor valve 26 controlled by flow controller 28 which receives a flow rate signal from transmitter 30. Instrument 28 has a set point represented by numeral 32 which can be varied to provide a selected flow rate.

A similar flow control arrangement in line 22 is provided including flow controller 34, motor valve 36, and transmitter 38.

Effluent line 40 transfers reaction mixture containing liquid catalyst, conversion product, and unconverted feed from the upper end of reactor 10 to settler 42 in which separation of the effluent into a heavy catalyst phase and a light hydrocarbon phase is effected. The hydrocarbon phase is discharged thru line 44 to a conventional HCl recovery and separation apparatus. The liquid catalyst phase is passed from the bottom of settler 42 thru line 46 to return line 20 under the impetus of pump 48. Makeup liquid catalyst is fed into line 46 thru line 50 as desired, or thru line 18.

Motor 16 receives current from a suitable source of supply 52 which is usually a standard 115–230 volt 60 cycle source. Ammeter 54 is connected in one of the lead lines between current source 52 and motor 16 and emits a signal proportional to the current flow thru the motor, said signal being transmitted thru line 56 to amplifier 58. Amplifier 58 emits an amplified signal thru line 60 to transducer 62. Transducer 62 has the capacity to convert an electric signal to a pneumatic signal and is supplied air thru line 64. The emitted air signal from instrument 62 passes thru line 66 to a recorder-controller 68 having a set point 70 which is set for a preselected viscosity of the mixture in reactor 10 in terms of the pressure of the pneumatic signal emitted by transducer 62. Controller-recorder 68 compares the pneumatic signal received with the set point and emits a pneumatic demand signal thru line 72 to flow controller 74. Transmitter 76 transmits a flow rate signal to flow controller 74 which compares the received pneumatic signals and adjusts motor valve 78 so as to match the signal from transmitter 76 with the signal from controller 68, thereby providing the flow rate of liquid catalyst thru line 20 which establishes the required preselected catalyst concentration or viscosity of the mixture in reactor 10.

Recorder-controller 68 and flow controller 74 are instruments equivalent to the Foxboro M-40 controller. Transducer 62 is a conventional instrument commercially available from various instrument supply companies. Amplifier 58 is any commercially available current amplifier.

It is also feasible to maintain the catalyst flow in line 20 relatively constant and of sufficient rate to provide the preselected concentration in reactor 10 for an average flow rate of feed in line 18 and control motor valve 26 in line 18 in response to the instrumentation applied to valve 78 in line 20. In other words, the flow rate of either hydrocarbon feed or catalyst is amenable to control in the manner specified so as to control the concentration of liquid catalyst in the reaction mixture.

The invention is applicable to any type of reaction in liquid phase in a stirred reactor in which the liquid catalyst has a materially different specific gravity than the liquid hydrocarbon feed. The invention is particularly applicable to the isomerization of (1) n-pentane to isomeric pentanes, (2) n-hexane to isomeric hexanes, (3) methylcyclopentane to cyclohexane, and (4) combinations of (2) and (3).

The specific gravity of the catalyst complex usually varies in the range of about 1.25 to 1.4 and the specific gravity of the hydrocarbon phase is usually in the range of 0.5 to 0.68. Broad limits on the hydrocarbon-to-catalyst ratio in the isomerization reactions listed above are in the range of about 1:1 to 8:1, with the presently preferred range being about 1.2:1 to 1.4:1.

The process of the invention is applicable to the alkylation of an isoparaffin with an olefin using a liquid catalyst such as an aluminum chloride-hydrocarbon complex or with a heavy acid catalyst such as hydrofluoric acid. It is also particularly applicable to the process disclosed in U.S. Patent 2,945,910, issued to I. A. Peterson, wherein an n-hexane rich stream is isomerized in liquid phase employing an aluminum chloride-hydrocarbon complex catalyst. In this type of process, the viscosities and specific gravities for the streams involved are set forth below:

|  | At Reactor Temperature and Pressure | | |
| --- | --- | --- | --- |
|  | Hydrocarbon | Oil-Free Catalyst | Reaction Mix |
| Viscosity, cp | 0.22 | 1.90 | 0.25 |
| Specific Gravity | 0.645 | 1.35 | 0.90 |

With these differences in specific gravity and viscosity, the horsepower requirements of the reactor mixer vary widely with changing catalyst-to-oil ratio in the reactor.

While the use of a recording ammeter as the measurement of power is preferred, it is also feasible to utilize a watt meter across the service lines to the motor in the control system which utilizes changes in wattage from a wattage reading in the motor circuit for a preselected viscosity and catalyst concentration in the reactor to control the flow of liquid catalyst to the reactor thru the system of controls disclosed and illustrated in the drawing.

Certain modifications of the invention will become apparent to those skilled in the art and the illustrative details disclosed are not to be construed as imposing unnecessary limitations on the invention.

I claim:

1. In an isomerization or alkylation process for effecting a catalytic reaction in liquid phase a reactor using a liquid catalyst having a substantially higher viscosity than the reaction mixture, mixing of said catalyst and reaction mixture is effected by a stirring device operated by an electric motor, and control of the ratio of said catalyst-to-reactant is desired to control the process, the improvement comprising the steps of:
    (1) sensing the power required by said electric motor; and
    (2) regulating the rate of feeding catalyst to said reactor in response to the sensed power, while maintaining flow of other feeds to the reactor substantially constant, so as to maintain the viscosity of said reaction mixture substantially constant.

2. The process of claim 1 wherein the feed being converted is an isomerizable hydrocarbon, the liquid catalyst is an AlCl$_3$-hydrocarbon complex, and HCl is fed into the reaction zone.

3. The process of claim 2 wherein said hydrocarbon is n-hexane.

4. An isomerization or alkylation process for catalytically converting a stream of reactant in liquid phase in admixture with a liquid catalyst having a substantially higher viscosity than the resulting reaction mixture which comprises the steps of:
    (1) feeding said stream of reactant to a reactor;
    (2) feeding a stream of said liquid catalyst to said reactor while maintaining conversion conditions therein to form conversion products;
    (3) rotating a stirrer in said reactor with an electric motor so as to maintain a reaction mixture containing catalyst, reactant, and conversion product;
    (4) withdrawing a stream of said reaction mixture from said reactor;
    (5) sensing the power required to operate said motor; and
    (6) regulating the rate of feed of catalyst in step (2) in response to the sensed power to maintain the viscosity of said reaction mixture substantially constant.

5. The process of claim 4 wherein the reactant is an isomerizable hydrocarbon, the liquid catalyst is an AlCl$_3$-hydrocarbon complex, and a low concentration of HCl is maintained in said reactor.

6. The process of claim 5 wherein said hydrocarbon n-hexane.

7. An isomerization or alkylation process for catalytically converting a stream of reactant in liquid phase in admixture with a liquid catalyst having a substantially higher viscosity than the resulting reaction mixture which comprises the steps of:
    (1) feeding said stream of reactant to a reactor;
    (2) feeding a stream of said liquid catalyst to said reactor while maintaining conversion conditions therein to form conversion product;
    (3) rotating a stirrer in said reactor with an electric motor so as to maintain a reaction mixture containing catalyst, reactant, and conversion product;

(4) withdrawing a stream of said reaction mixture from said reactor;
(5) sensing the power required to operate said motor; and
(6) regulating the rate of feed of one of said catalyst (Step 2) and said reactant (Step 1) in response to the sensed power so as to maintain the viscosity of said reaction mixture substantially constant.

References Cited

UNITED STATES PATENTS

| | | | |
|---|---|---|---|
| 2,665,197 | 1/1954 | Rowland | 23—285 |
| 2,792,338 | 5/1957 | Davidson et al. | 260—683.57 X |
| 2,850,552 | 9/1958 | Ogle | 260—683.43 |
| 2,855,448 | 10/1958 | Goard | 260—683.57 |
| 2,908,734 | 10/1959 | Cottle | 23—285 |
| 2,945,910 | 7/1960 | Peterson | 260—683.74 |
| 3,078,265 | 2/1963 | Berger et al. | 23—285 |
| 3,303,230 | 2/1967 | McMinn | 260—671 |
| 3,317,435 | 5/1967 | Yamashita et al. | 23—285 |

OTHER REFERENCES

Dawes: Industrial Electricity, part II, 2nd ed., McGraw-Hill, New York, 1942, p. 278.

Kirk et al.: Encyclopedia of Chemical Technology, vol. 14, pp. 770–72, Interscience Publishers, New York, 1955.

DELBERT E. GANTZ, *Primary Examiner.*

G. J. CRASANAKIS, *Assistant Examiner.*

U.S. Cl. X.R.

23—285, 288; 260—683.43, 683.65, 683.77